Patented May 19, 1953

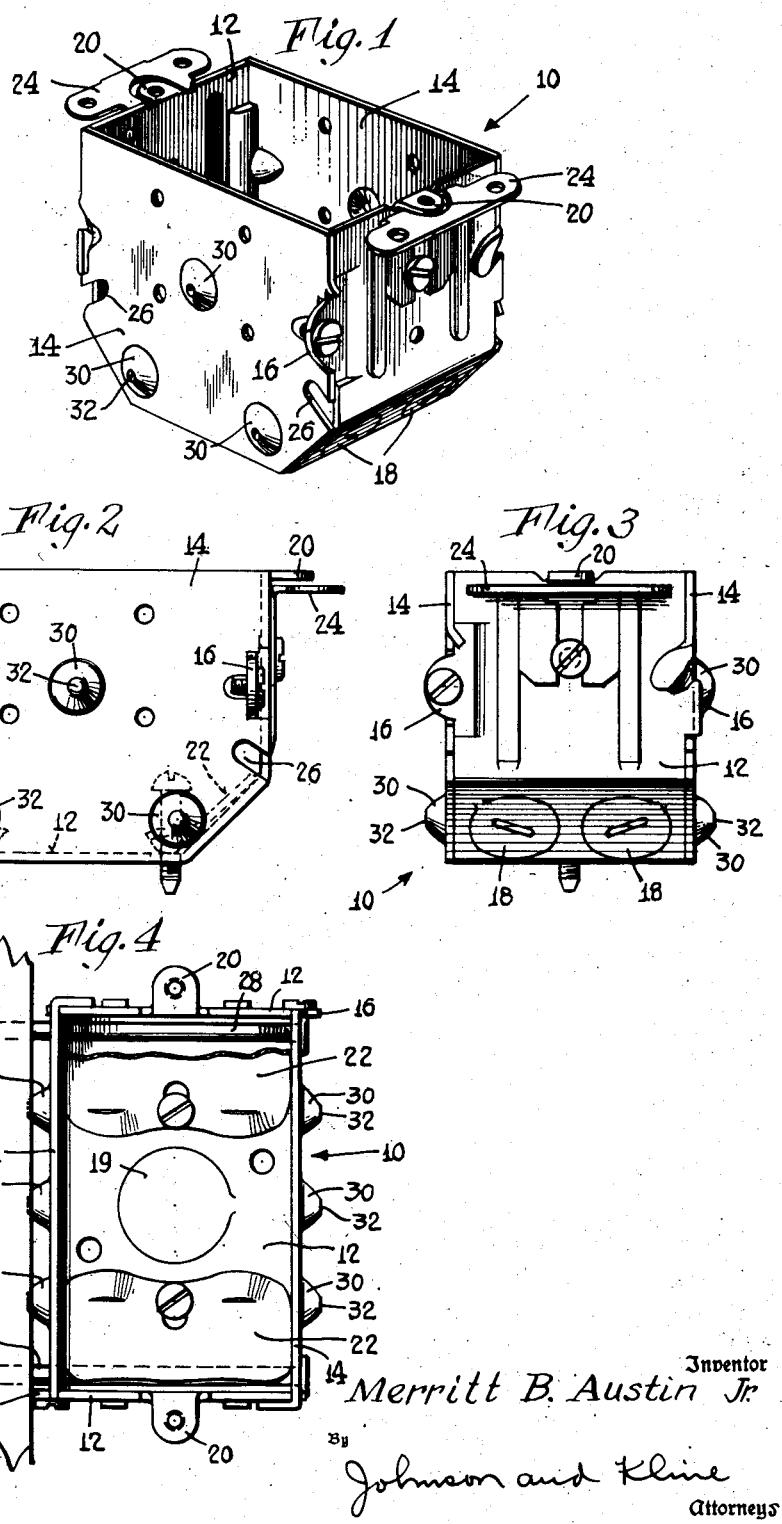

2,639,054

UNITED STATES PATENT OFFICE 2,639,054

ELECTRICAL OUTLET BOX

Merritt B. Austin, Jr., Deerfield, Ill.

Application June 27, 1950, Serial No. 170,534

2 Claims. (Cl. 220—3.92)

This invention relates to junction and outlet boxes for use in electric wiring and more particularly to the mounting means for such boxes.

Certain types of outlet boxes, for example switch boxes, are usually used in locations such as vertical building walls wherein they may often be conveniently attached to vertical structural members or studs in the wall by nailing to the sides thereof. For this purpose it has been known to construct a box one wall of which is provided with ears or bracket members which extend above and below the box and which are pierced for direct attachment to the studding by nails. This type of box not only requires additional material to make, but is also somewhat awkward to mount in that the nails must be driven in close proximity to certain of the outstanding box walls, which operation requires particularly careful and painstaking nail driving procedures. Furthermore, because of the projecting brackets or ears, it does not lend itself readily for conversion to use in the ordinary manner of mounting.

It is the purpose of this invention to avoid the foregoing disadvantages by constructing a box provided with aligned openings for nails or other fasteners passing through the two opposite side walls of the box so that nails may be passed clear through the box and driven with its head against the outer surface of the box.

Since this type of fastening leaves a fairly long length or lever arm of the nail exposed between the head and the studding, it would normally require relatively small forces to twist the box from its desired position, especially when mounted with only two nails. It is another object of the invention, therefore, to provide the walls of the box with means for interengagement with the surface of the studding to prevent such twisting movement or dislocation of the box once the fasteners have been tightened.

It is found that boxes, particularly deep boxes for holding switch blocks, and boxes which are intended for ganging are most readily constructed of sections bent and formed from flat plates with means for connecting the parts to form a box. As usually constructed the connecting means includes unsymmetrical ears which project laterally from the box and which would therefore cause the same to be out of line if nailed directly to the surface of the studding. It is a further object of the invention, therefore, to provide spacing means abutting the studding to avoid misaligning interference by any of the usual laterally projecting ears.

An additional object of the invention is to provide elements on the side of the box which are capable of combining the foregoing interengaging and spacing functions.

Additional features and advantages will hereinafter appear.

In the drawing:

Figure 1 is a perspective view of an electrical wiring accessory or outlet box in accordance with the invention.

Fig. 2 is a side elevation of the box of Fig. 1.

Fig. 3 is an end elevation of the box of Figs. 1 and 2.

Fig. 4 is a view of the box looking at the open side thereof, or from the top in Figs. 2 and 3, and showing the box fastened in position against a supporting member such as a vertical stud in a building wall.

According to the present invention there is provided an electrical wiring accessory or outlet box 10. The particular form of the box shown in the drawing includes a conventional C-shaped sheet metal spacer member 12 to each end of which is attached a removable sheet metal side plate 14. The connection means between the C-shaped member 12 and the side plates 14 is conventional and includes unsymmetrical laterally extending ears 16 formed on the edges of the C-shaped member and projecting from the box at two diagonally disposed corner edges. The box is also provided with the usual knockouts 18, 19, switch mounting tabs 20, cable clamps 22, and adjustable plaster ears 24 for mounting the box in the conventional manner if desired.

In the foregoing respects the box of this invention is like conventional switch boxes. By a slight change in the structure, this box is rendered convertible, and suitable for use either by ordinary mounting procedures, or for nailing up to the studding. Previously it has been the custom to provide a substitute side plate replacing one of the plates 14, and which was provided with pierced ears or extensions suitable for nailing to the studding. According to the present invention, however, this interchange is rendered unnecessary and the same box may be used in either fashion, the nailing up of the box being accomplished by nailing through the box itself in its present form. To this end each plate 14 has openings 26, each of which lines up with a corresponding opening in the other plate 14, said openings being capable of receiving nails 28 passing clear through the box. Broadly the openings 26 may be located at any point in the plates 14, but for the best results and for simplest manufacture they are formed as notches at the edges of the plate. In this way the openings are most easily and economically formed, the nails 28 do not interfere with or materially restrict the useful space on the interior of the box, and the nail heads are permitted to overlie the edges of the spacer 12 so that the latter may take the force of the final hammer blows and provide an arrangement which will be largely proof against denting or bending of the side plates 14 during the nailing up operation.

Either one of the side plates 14, and preferably both as shown in the drawing, is provided with a plurality of projections 30 which extend outwardly of the box and whose tips define a plane parallel to the plate 14 and spaced therefrom approximately as far as the outward extent of ear 16. The projections 30 are preferably produced by embossing or stamping the same in the plate 14 at the time it is being formed. They are preferably formed in both side plates so that the box can be used in a flexible manner for nailing up from either side.

In the preferred form of the invention shown in the drawings the projections are substantially frusto-conical and have end surfaces 32 which are substantially flat and of reduced area, three being formed on each plate 14. The projections 30 are preferably arranged at the vertices of an isosceles triangle, the altitude of said triangle which bisects the angle between the equal sides being approximately bisected by a line joining the openings 26, i. e., by the plane of the fasteners 28. Preferably the triangle defined by projections 30 is also nearly equilateral as shown in Figs. 1 and 2.

The projections 30 form feet which rest against the side of a support member 34 such as a stud in a building wall, and which hold the box spaced from the support 34 as shown in Fig. 4. In this fashion, the nails 28 may be driven home without causing the box 10 to cock or tilt due to the presence of the unsymmetrical ear 16. In fact the ear 16 forms another projection which, to a certain extent, cooperates with the projections 30 in spacing the box 10 from the support 34. Although not the presently preferred form of the invention, it is contemplated that one of the projections 30 may be dispensed with on each side, and that the others may be so placed as to cooperate with a third projection in the form of ear 16 to define a plane parallel to the plate 14.

The projection 30 which is uppermost in Fig. 2 is preferably so located that all of its support contacting portions are at least .75 inch from the open side of the box 10. With this construction, the box 10 may be so mounted that its open side projects ahead of the edge of the stud or support member 34 any desired amount up to and including .75 inch. In this way the box position is readily adjusted to accommodate whatever thickness of wallboard or plaster the construction plans call for within the range normally employed.

When the box 10 is to be mounted by nailing up, it is placed against the wooden stud 34 with the projections 30 in contact with the surface thereof. The nails 28 are passed through openings 26 and are driven home, the last few blows acting to embed the projections 30 (and possibly the additional projection consisting of ear 16) slightly into the surface of the stud 34 as shown in Fig. 4. It can be seen that, due to this embedment, the box will not be permitted to cock or tilt by sliding over the surface of the stud 34. This is true even though only two nails are used in the mounting, and even though a substantial length of each nail remains exposed outside of the wood subject to the application of substantial leverage by the box.

The driving home of nails 28 is made simple and convenient due to the placement of openings 26 adjacent the edges of plates 14, whereby the thrust of the nail heads can be taken substantially edgewise by the spacer 12, and extreme care is not required to prevent overloading and bending plate 14 during the final hammer blows. The location of the openings 26 is also such that even distribution of the nail thrust on the projections 30 is provided. Preferably, although not necessarily, that nail 28 which passes through the opening 26 substantially in line with one of the projections 30 and the ear 16 adjacent the stud 34 is the nail to be driven home first, for that is the one which provides the firmest resistance and the least tendency to drawing of the box end towards the stud as the nail is driven home. The other nail can then be more readily placed and driven with the box firmly held by the first nail.

While mounting of the box, in the foregoing descriptions, is discussed for convenience in terms of "nailing" and using "nails," it will be readily appreciated that any elongate headed fastening elements, such as wood screws, which may pass through the openings 26 and enter the support 34, may likewise be employed, and the use of such fastening means is comprehended in the invention.

The fasteners used in mounting the box of this invention are of standard sizes, and the openings 26 are made to receive such standard size fasteners. For the purposes of this description the expression "standard size" as applied to fasteners includes 10-penny, 12-penny and 16-penny nails. Nails of these sizes have standard heads which are at least ¼ inch in diameter and which have at least $\frac{1}{16}$ inch overhang beyond the nail body. Standard headed screw fasteners come in substantially corresponding lengths with corresponding sized heads and are also included in the expression.

From the foregoing explanation it is apparent that the invention provides a junction or outlet box which may be inexpensively constructed, and which is at the same time capable either of being mounted in conventional fashion or of throughnailing to a support in a convenient manner without the necessity for interchange of parts, and without using projecting brackets or ears for nailing.

Variations and modifications may be made within the scope of the claims and portions of the improvements may be used without others.

I claim:

1. An electrical wiring accessory comprising an open-sided sectional sheet metal box including a C-shaped spacer member and a pair of removable sides closing opposite ends of said spacer member; means for retaining said sides on said spacer, including integral tabs, one extending beyond each of said sides, said sides having aligned openings for receiving fasteners to be driven from one side of the box into a support member which is adjacent the other side; and three spaced blunt spacing projections located within the edges of and extending outwardly from said other side, the tips thereof lying in a plane perpendicular to the open side and spacing the said other side sufficiently from the surface of a supporting member to prevent misaligning interference of the corresponding tab with the portion of the surface on which the box is mounted, said projections having convergently inclined sides and having extremities of substantially reduced area adapted for slight anchoring embedment in the supporting surface when the same is of usual wood studding material, and forming a triangular support for the box with one altitude of the triangle passing through the plane of the fasteners whereby rocking of the box is substantially prevented after the fasteners are driven home.

2. An electrical wiring accessory comprising an open-sided sectional sheet metal box including a C-shaped spacer member and a pair of removable sides closing opposite sides of said spacer member; means for retaining said sides on said spacer member, said sides having aligned notches in corresponding edges cooperating with portions of the C-spaced spacer to form mounting holes for receiving fasteners to be driven from one side of the box into a support member which is adjacent the other side; and at least three blunt spacing projections extending outwardly from at least one of said sides and spaced inwardly of said notches, the outermost portions of said projections lying in a plane perpendicular to the plane containing the open side and spacing said other side sufficiently from the surface of the support member to prevent misaligning interference between the box and the surface of the support member on which the box is mounted, said projections having inclined sides creating cross-sections therein of increasing area from the outermost portion of the projection to the base thereof, with said outermost portions having substantially reduced areas small enough to be capable of providing an anchoring embedment in the support member when the same is of the usual wood material, whereby rocking of the box is substantially prevented after the fasteners are driven home.

MERRITT B. AUSTIN, Jr.

References Cited in the file of this patent

UNITED STATES PATENTS

| Number | Name | Date |
|---|---|---|
| 1,296,811 | Keller | Mar. 11, 1919 |
| 1,605,168 | Burk et al. | Nov. 2, 1926 |
| 1,776,126 | MacMillen | Sept. 16, 1930 |
| 2,214,968 | MacMiller | Sept. 17, 1940 |
| 2,299,674 | Austin, Jr. | Oct. 20, 1942 |